Oct. 22, 1963  B. I. ULINSKI  3,107,925
STEERING MECHANISM FOR INDUSTRIAL TRUCK
Filed Nov. 24, 1961  2 Sheets-Sheet 1
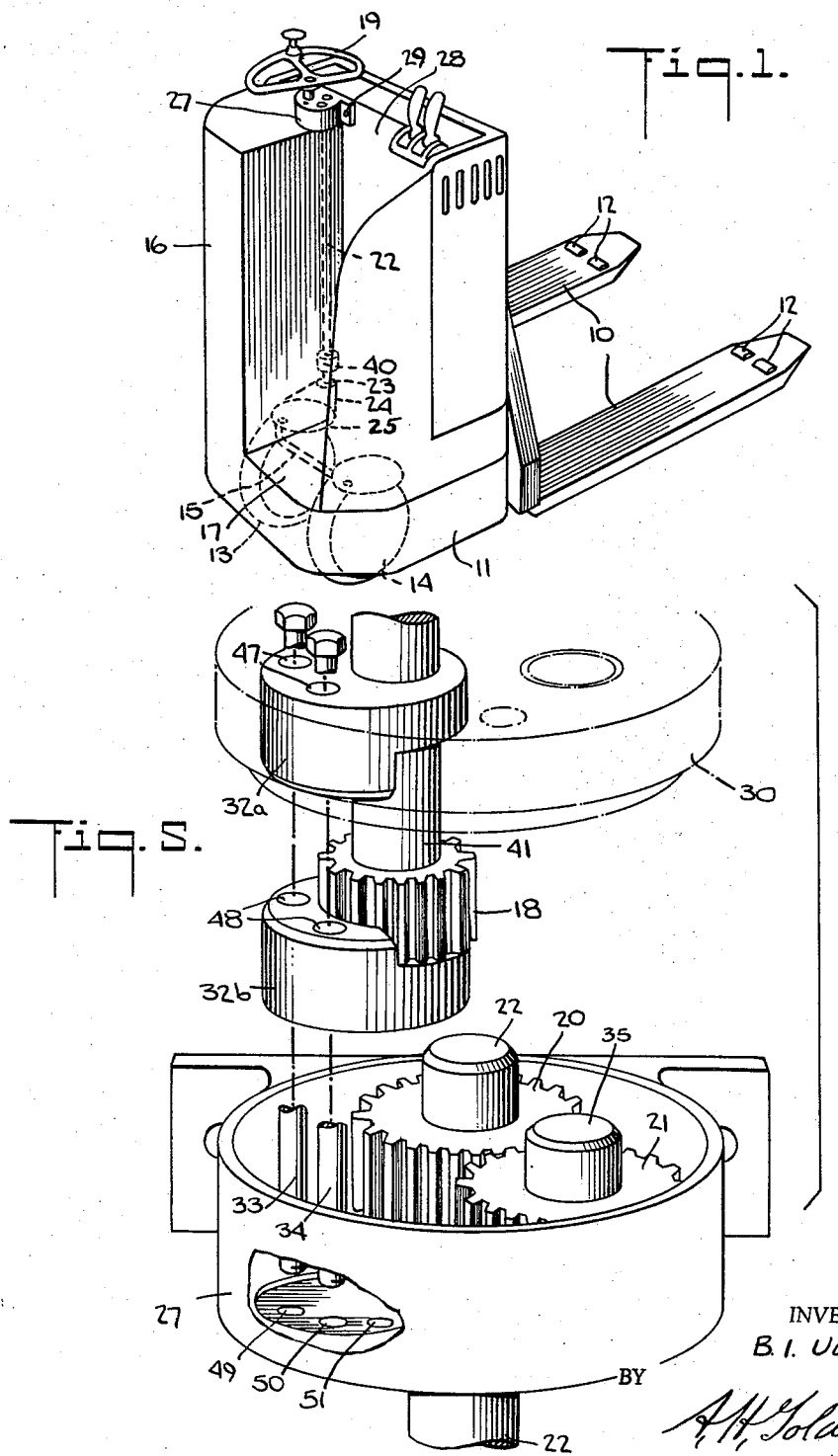
INVENTOR.
B. I. ULINSKI
BY
A. H. Golden
ATTORNEY

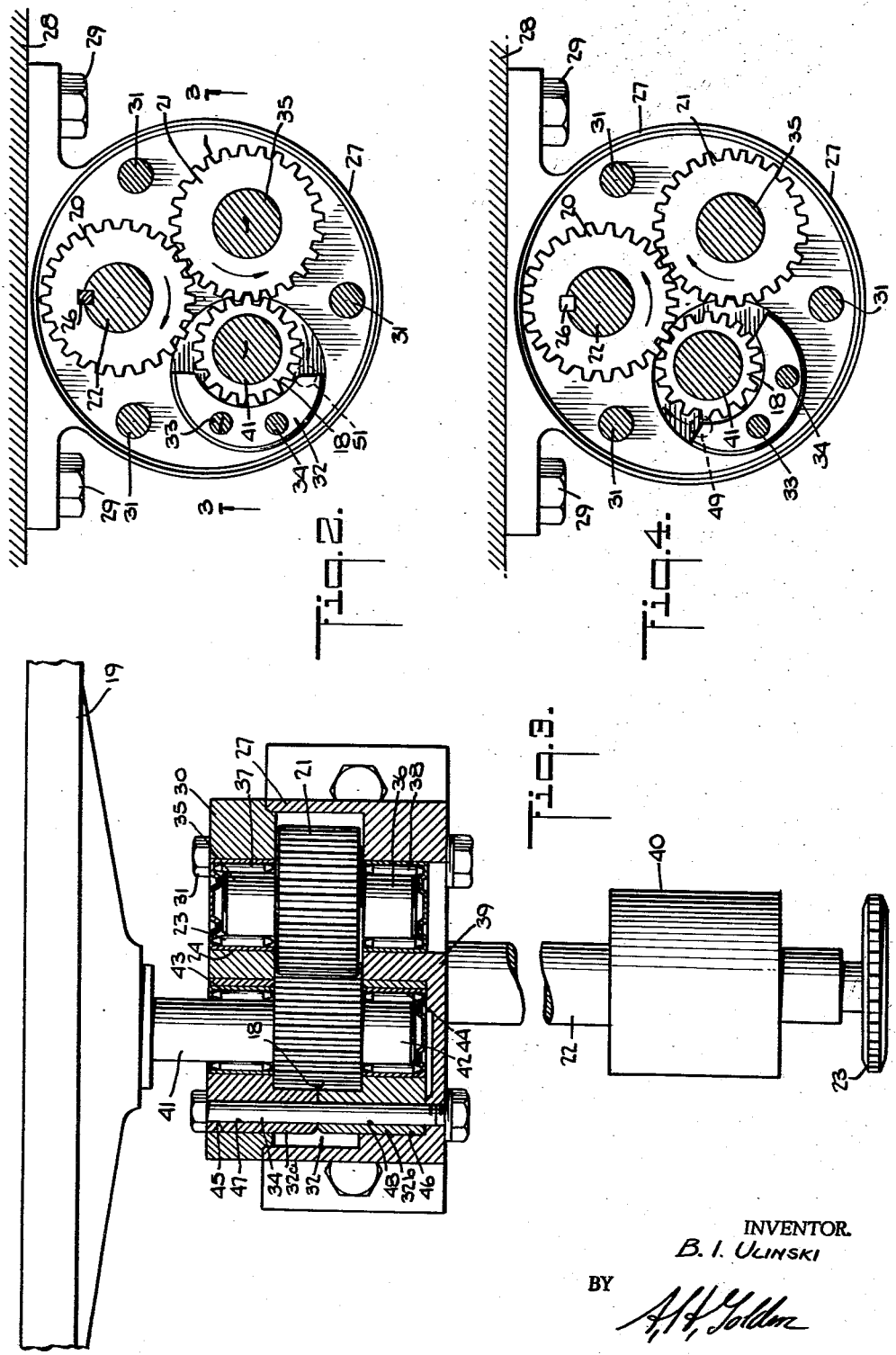

United States Patent Office 3,107,925
Patented Oct. 22, 1963

3,107,925
STEERING MECHANISM FOR
INDUSTRIAL TRUCK
Bronislaus I. Ulinski, Flossmoor, Ill., assignor to The
Yale and Towne Manufacturing Company, Stamford,
Conn., a corporation of Connecticut
Filed Nov. 24, 1961, Ser. No. 154,531
9 Claims. (Cl. 280—96)

This invention relates to industrial trucks, and in particular to the steering mechanisms of such trucks.

Some users of industrial trucks prefer that the steerable ground engaging wheels of the truck turn in the same direction as that in which the steering or handle is turned. Other users prefer that the ground engaging wheels turn in the opposite direction from that in which the steering wheel or handle is turned. This, of course, means that in order to satisfy both classes of users, truck manufacturers must provide trucks with each type of steering.

The purpose of this invention is to provide a steering mechanism which may be quickly and easily changed to provide either type of steering in the same truck in order to meet the steering preference of the user.

To this end, the steering mechanism of the invention includes a pinion rotatable by a steering wheel, or handle, and a pair of meshing gears, one gear of which is connected to a steerable ground engaging wheel of the truck. Means are provided for mounting the pinion in a first position in which it meshes with one of the gears and a second position in which it meshes with the other gear. Thus, in one position of the pinion, the steerable ground engaging wheel turns in one direction in response to the turning of the steering wheel in a particular direction, and in the other position of the pinion, the steerable ground engaging wheel turns in the opposite direction in response to such movement of the steering wheel. The type of steering, therefore, may be quickly and easily changed in a particular truck by merely changing the position of the pinion so that it meshes with a different gear of the pair of gears.

Because the steering mechanism of the invention allows the steering in the same truck to be quickly and easily changed from one type to the other, the invention is not only useful in new trucks to permit the manufacturer to change the type of steering to meet the demand of a particular customer, but also is useful in rental trucks to permit the rentor to quickly and inexpensively change the steering to meet the steering preferences of the many different users of the same truck.

The invention and its advantages having been broadly described, a more detailed description of one embodiment of the invention is given hereafter by reference to the accompanying drawings, wherein:

FIG. 1 is a perspective view of an industrial truck incorporating a steering mechanism constructed in accordance with the invention;

FIG. 2 is a plan view of the casing or housing which supports the pair of meshing gears and the steering pinion, showing the steering pinion meshing with one of the gears of the pair of gears, whereby the steerable, ground engaging wheel turns in one direction in response to rotation of the pinion by a steering wheel;

FIG. 3 is a sectional view taken on the line 3—3 of FIG. 2;

FIG. 4 is a plan view similar to that shown in FIG. 2, but showing the steering pinion in a second position in which it meshes with the other gear of the pair of gears, whereby the steerable, ground engaging wheel turns in the opposite direction in response to rotation of the pinion by a steering wheel; and FIG. 5 is an exploded view illustrating the assembly of the pinion, gears and housing or casing.

Referring to the drawings, and in particular to FIG. 1, a steering mechanism constructed in accordance with the invention is shown applied to an industrial truck of the general type illustrated in United States Patent No. 2,713,918. While the invention is described hereafter in connection with such a type of truck, it will be appreciated that the invention is also applicable to other types and styles of industrial trucks.

It is sufficient to an understanding of the invention to point out that the particular truck illustrated is of the type commonly referred to as a pallet truck, and includes forks 10 which are supported at one end for vertical movement on a frame 11 and are supported at their free ends by wheels or rollers 12 which are pivoted downwardly as the forks are raised. The main frame 11 in turn is supported by a pair of ground engaging wheels 13 and 14 which are mounted for steering rotation on the frame 11, and are connected together for simultaneous steering movement by a tie rod 15. The wheel 12 is normally a traction wheel which is driven by a suitable electric motor, not shown, enclosed within a compartment 16 provided on the frame 11.

The frame 11 is also provided with a platform 17 on which an operator of the truck may stand while operating the truck. In utilizing the truck to move a pallet supported load, the operator manuvers the truck to insert the forks 10 through the pallet, and then raises the forks relatively to the frame 11 to lift the pallet a few inches from the floor. As the forks 10 are raised, the wheels 12 are pivoted downwardly to raise and support the free ends of the forks. The pallet and any load supported thereon is then transported by the truck while in the raised position.

The steering mechanism, by which the truck is steered, includes as best shown in FIGS. 2 and 3, a steering pinion 18, rotatable by a steering wheel or handle 19, and a pair of meshing gears 20 and 21. As best shown in FIG. 1, gear 20 is connected to the steerable, ground engaging wheel 13 through a vertical shaft 22, a sprocket 23 which is secured to the lower end of the shaft 22, and a chain 24, shown in FIG. 1, which provides a driving connection between the sprocket 23 and a sprocket 25 which is secured to the steerable wheel 13. The gear 20 is connected to the upper end of the shaft 22 by a key 26, shown in FIGS. 2 and 4, and rotation of the gear 20, therefore, results in steering movement of the steerable wheel 13 and, also, the steerable wheel 14 which is secured to the wheel 13 by the tie rod 15. The pinion 18 and gears 20 and 21 are mounted in a suitable housing 27 which is secured, as shown in FIG. 1, to a vertical portion 28 of the main frame 11, above the compartment 16, by bolts 29. The housing 27 is provided with a removable cover 30 to permit assembly of the pinion and gears within the housing. The cover is normally secured to the housing by three through bolts 31.

In accordance with the invention, the pinion 18 is supported for rotation by means of a mounting member 32 which may be moved relatively to the housing 27 between a position in which the pinion 18 meshes with the gear 21, as shown in FIG. 2, and a position in which the pinion 18 meshes directly with the gear 20, as shown in FIG. 4. In the preferred form as shown, the mounting member 32 is of cylindrical shape, and the pinion 18 is mounted eccentrically relatively to the center of the mounting member so that the pinion 18 may be moved between the two positions by rotating the mounting member 32 a few degrees about its geometric center. As best shown in FIGS. 3 and 5, the mounting member 32 is formed in two parts 32a and 32b to facilitate the assembly thereof with the pinion 18.

When the pinion 18 is in mesh with the gear 21, as shown in FIG. 2, rotation of the pinion 18 by means of the steering wheel or handle 19 results in rotation of gear 20 through gear 21 so that the steerable wheels 13 and 14 turn in the same direction as the steering wheel or handle 19 is turned. When, however, the pinion 18 is in mesh directly with the gear 20, as shown in FIG. 4, rotation of the pinion 18 by the steering wheel or handle 19 results in turning of the steerable wheels 13 and 14 in a direction opposite to the direction in which the steering wheel or handle 19 is turned. Thus, the type of steering may be quickly and easily changed merely by changing the position of the mounting member 32 to move the pinion 18 from meshing engagement with one gear to meshing engagement with the other gear. As will be described in detail hereafter, the mounting member 32 may be locked in either the position shown in FIG. 2 or the position shown in FIG. 4 by means of through bolts 33 and 34.

As best shown in FIG. 3, the gear 21 is conveniently mounted for rotation in the housing 27 by means of stub shafts 35 and 36 which are formed integrally with the gear 21 and extend into anti-friction bearings 37 and 38 provided, respectively, in the cover 30 and the bottom 39 of the housing 27. The gear 20 is similarly mounted for rotation in the housing 27 by anti-friction bearings, not shown, which are also provided in the cover 30 and the bottom 39 of the housing 27 and receive portions of the shaft 22 extending from opposite sides of the gear 20. The shaft 22 extends downwardly from the housing 27 and a bearing 40 secured to the vertical portion 28 of the frame 11 supports the lower end of the shaft 22 adjacent the sprocket 23.

As best shown in FIG. 3, the pinion 18 is provided with stub shafts 41 and 42 which are formed integrally with the pinion 18 and are received in anti-friction bearings 43 and 44 provided, respectively, in the upper part 32a and the lower part 32b of the mounting member 32. The upper stub shaft 41 extends from the upper side of the upper part 32a of the mounting member 32, and the steering wheel or handle 19 is secured to the outer end thereof. The part 32a is rotatably received in a cylindrical opening 45 through the cover 30 of the housing 27, and the part 32b is rotatably received in a cylindrical recess 46 formed in the bottom 39 of the housing 27 so that the parts 32a and 32b forming the pinion mounting member 32 may be easily rotated to change the position of the pinion 18.

As previously stated, the mounting member 32 is adapted to be locked or secured in either the position shown in FIG. 2, or the position shown in FIG. 4, by means of through bolts 33 and 34. As best shown in FIGS. 2, 4 and 5, the bolts 33 and 34 extend through aligned holes 47 and 48 through the parts 32a and 32b and through two of three holes 49, 50 and 51 formed through the bottom 39 of the housing 27. The mounting member 32 may be locked in the position shown in FIG. 2 by extending the bolts 33 and 34 through holes 49 and 50, and the mounting member 32 locked in the position shown in FIG. 4 by extending the bolts 33 and 34 through holes 50 and 51. It will be noted that the position of the mounting member 32 may be quickly and easily changed without removal of the cover 30 by merely removing the nuts at the lower ends of the through bolts 33 and 34, lifting the bolts sufficiently that the lower ends thereof clear the upper surface of the bottom 39 of the housing 27, rotating the mounting member 32 to bring pinion 18 into a new position, reinserting the bolts through a different pair of the holes 49, 50 and 51, and applying the nuts to the lower ends of the bolts. During such rotation of the mounting member 32, the upper part 32a rotates in the opening 45 and the lower mounting member 32b rotates in the recess 46, while the steering wheel or handle 19 rotates with the mounting member.

From the preceding description, it can be seen that there is provided a novel steering mechanism for an industrial truck which permits the type of steering, i.e., the direction of steering movement of the steerable wheel relatively to the direction of movement of the steering wheel, to be quickly and easily changed. Further, the change in the type of steering may be made without adding any new parts, without removing the steering wheel, and without removal of the cover for the housing of the steering gears.

While the preferred form of the invention has been shown and described, it will be appreciated that this is for the purpose of description, and that changes and modifications may be made therein without departing from the spirit and scope of the invention.

I now claim:
1. In an industrial truck,
   (a) a frame,
   (b) a steerable ground engaging wheel mounted for steering rotation on said frame,
   (c) a pair of meshing gears,
   (d) gear mounting means mounting said pair of gears for rotation on said frame,
   (e) means interconnecting one of said gears and said steerable wheel whereby rotation of said one gear effects steering rotation of said steerable wheel,
   (f) a pinion
   (g) a steering wheel,
   (h) means interconnecting said steering wheel and said pinion whereby rotation of said steering wheel effects rotation of said pinion,
   (i) pinion mounting means mounting said pinion for rotation by said steering wheel, and
   (j) means for securing said pinion mounting means to said gear mounting means in a first position in which said pinion meshes with one of said gears whereby rotation of said pinion by said steering wheel in one direction rotates said steerable wheel in one direction and in a second position in which said pinion meshes with the other of said pair of gears whereby rotation of said pinion by said steering wheel in said one direction rotates said steerable wheel in the opposite direction.

2. An industrial truck as defined in claim 1, in which said gear mounting means is in the form of a housing secured to said frame with said gears enclosed in said housing, and in which said pinion mounting means and pinion are secured within said housing.

3. An industrial truck as defined in claim 2, in which said pinion mounting means is of cylindrical shape and the pinion is mounted for rotation in said pinion mounting means about an axis which is eccentric to the center of said pinion mounting means, whereby said pinion mounting means may be moved between said first and second positions by rotation thereof.

4. An industrial truck as defined in claim 3, in which said housing has a cover secured thereto, and said cover has an opening rotatably receiving an outer end portion of said pinion mounting means.

5. An industrial truck as defined in claim 4, in which the means interconnecting the pinion and steering wheel is a shaft which is secured to said pinion and extends outwardly of said outer end portion of said mounting means, and the steering wheel is connected to the outer end of said shaft which extends outwardly of said mounting means.

6. An industrial truck as defined in claim 5 in which the shaft is formed integrally with the pinion and extends from each side of said pinion, and said pinion mounting means is in two parts with one part rotatably supporting the shaft on one side of the pinion and the other part rotatably supporting the shaft on the other side of the pinion.

7. An industrial truck as defined in claim 6, in which said means for securing said pinion mounting means to said gear mounting means includes openings through said pinion mounting means and through said gear mounting means and bolt means extendible through said openings to secure said pinion mounting means to said gear mounting means in said first and second positions.

8. An industrial truck as defined in claim 1, in which the gear mounting means is in the form of a housing which is secured to said frame and encloses said pair of gears, said pinion and said pinion mounting means, and in which the means interconnecting said pinion and said steering wheel includes a shaft connected to said pinion and extending through an opening in said housing, said opening being of sufficient size to accommodate movement of said shaft with said pinion during movement of said pinion mounting means between said first and second positions.

9. In an industrial truck as defined in claim 8, in which the housing has a removable cover to permit assembly of said pinion mounting means and said pinion and gears in said housing, and said opening for said shaft is in said cover.

References Cited in the file of this patent

UNITED STATES PATENTS

| 1,588,395 | Winn | June 8, 1926 |
| 1,680,676 | Gearing | Aug. 14, 1928 |
| 2,795,965 | Hinton | June 18, 1957 |